(12) United States Patent
Klein et al.

(10) Patent No.: US 7,642,461 B2
(45) Date of Patent: Jan. 5, 2010

(54) LEADTHROUGH AND A SEALING ELEMENT FOR THE LEADTHROUGH

(75) Inventors: Manfred Klein, Kaufering (DE); Mario Paetow, Igling (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/998,638

(22) Filed: Nov. 29, 2007

(65) Prior Publication Data

US 2008/0128998 A1  Jun. 5, 2008

(30) Foreign Application Priority Data

Dec. 1, 2006  (DE) .................. 10 2006 035 475

(51) Int. Cl.
*H02G 15/08* (2006.01)
(52) U.S. Cl. .................................. 174/93
(58) Field of Classification Search .................. 174/93, 174/50.56, 262; 52/232; 277/267
See application file for complete search history.

(56) References Cited

U.S. PATENT DOCUMENTS 1,783,605 A * 12/1930 Della ........................ 285/4
5,305,799 A * 4/1994 Dal Palu .................. 138/109
5,456,050 A * 10/1995 Ward ...................... 52/220.8
5,634,311 A * 6/1997 Carlton ..................... 52/577
2002/0170728 A1* 11/2002 Holland et al. .............. 174/19

FOREIGN PATENT DOCUMENTS

| DE | 3636663 | 11/1987 |
| EP | 0940615 | 9/1999 |
| JP | 0034058 | 12/2005 |
| WO | 8804487 | 6/1988 |

OTHER PUBLICATIONS

Search Report of British Patent Office.

* cited by examiner

*Primary Examiner*—Chau N Nguyen
(74) *Attorney, Agent, or Firm*—Abelman, Frayne & Schwab

(57) ABSTRACT

A sealing element for a leadthrough (10) for passing of conduits (40) through constructional components (50), has a flexible tubular body (14) rotatable along its longitudinal axis (L) that serves as a rotational axis, and on at least first axial end (12) of which, a securing element is provided.

14 Claims, 4 Drawing Sheets

LEADTHROUGH AND A SEALING ELEMENT FOR THE LEADTHROUGH

BACKGROUND OF THE INVENTION

1. Field of the Invention

The present invention relates to a leadthrough for passing conduits such as, e.g., tubular conduits, cables, or cable channels through constructional components such as, e.g., ceilings and walls, and having a jacket tube, and relates, in particular, to a sealing element of the leadthrough.

2. Description of the Prior Art

Leadthroughs of the type described above are installed during the formation of a constructional component such as a wall or ceiling, or is inserted thereinto subsequently, after the wall or ceiling has been formed. In particular, the leadthrough can be cast into a concrete wall or a ceiling or, alternatively, subsequently, necessary openings are drilled, sawed, or cut. Preferably, such leadthroughs are provided with a fire protection function. From the time of installation or casting of the leadthrough in a constructional component and installation of a conduit through the leadthrough, there already exists a need in fire protection. Further, it is important with such leadthroughs to insure their inner tightness against gaseous media, such as, e.g., a flue gas.

U.S. Patent Publication US 2004/0016190 discloses a device for passing conduits and which includes a jacket tube and a base part connected with the jacket tube. The base part has a receiving space for firestop means and which surrounds the through-opening. As the firestop means, an intumescent mass, which expands in case of fire and closes the opening, is used. Between the firestop means and a shoulder, an annular, a diaphragm-shaped sealing of an elastomeric material is provided. The seal has an opening smaller than the through-opening of the jacket tube.

The drawback of the known device consists in that the internal tightness against gaseous media such as air or flue gas is very small and, therefore, gastightness should be insured with additional measures which increase the assembly costs and make the leadthrough more expensive.

Accordingly, an object of the present invention is to provide a sealing element for a leadthrough for passing conduits through constructional components and which would provide an improved gastightness in the mounted condition of the leadthrough, with a conduit passing therethrough.

SUMMARY OF THE INVENTION

This and other objects of the present invention, which will become apparent hereinafter, are achieved by providing a sealing element having a flexible tubular body rotatable along a longitudinal axis of the tubular body that serves as a rotational axis, and a securing element provided on at least one axial end of the tubular body with which the tubular body is secured in the jacket tube of the leadthrough.

The advantage of forming the sealing element as an elastic tubular body consists in that the tubular body, because of its elasticity, can be twisted around its longitudinal axis, whereby the inner diameter of the tubular body becomes reduced and the tubular body tightly surrounds the conduit that extends through the leadthrough. The contact between the tubular body and the conduits is provided over a curtain length, which insures a very high tightness. Before rotation of the tubular body, it has a large-cross-section that permits passing of a conduit through the tubular body, without damaging it.

Advantageously, the two axial ends of the tubular body rotate relatively to each other generally by angle of at least 45°, preferably, at least 90°. Thereby, a very good tightness with respect to the conduit that extends through the tubular body, can be achieved. In order to insure gastightness of a tubular body through which no conduit extends, the two ends of the tubular body are rotated relative to each other by an angle of at least 180°. The material, which is used for producing tubular bodies, is generally very thin and has preferably, a thickness 0.01 to 2 mm.

Advantageously, a further securing element is provided on the second axial end of the tubular body. Thereby, the tubular member can be releasably secured in the jacket tube at both of its ends.

Advantageously, the securing element has at least one locking element cooperating with a counter-locking element provided on a jacket tube of the leadthrough. The locking element provides for an easy releasable connection of the tubular body with the jacket tube.

Advantageously, the securing element is formed of several parts containing a ring member connected with the tubular body for at least joint rotation therewith, and a support member connectable with the ring member, with the at least one locking member being arranged on the support member.

Advantageously, the tubular body is formed of gastight material such as, e.g., cloth, rubbery material, or foil material, which material also has elastic properties.

It is advantageous when an elastic material such as, e.g., foamed or rubbery material is provided on the inner side of the tubular body. The layer of the elastic material on the inner side of the tubular body further improves tightness between the tubular body and a conduit extending therethrough.

Advantageously, the tubular body has in its middle region a waist-shaped section. Thereby, a maximum possible reduction of the cross-section of the opening can be achieved, so that with a conduit not yet extending through the leadthrough, an open cross-section is not too large in an open condition.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
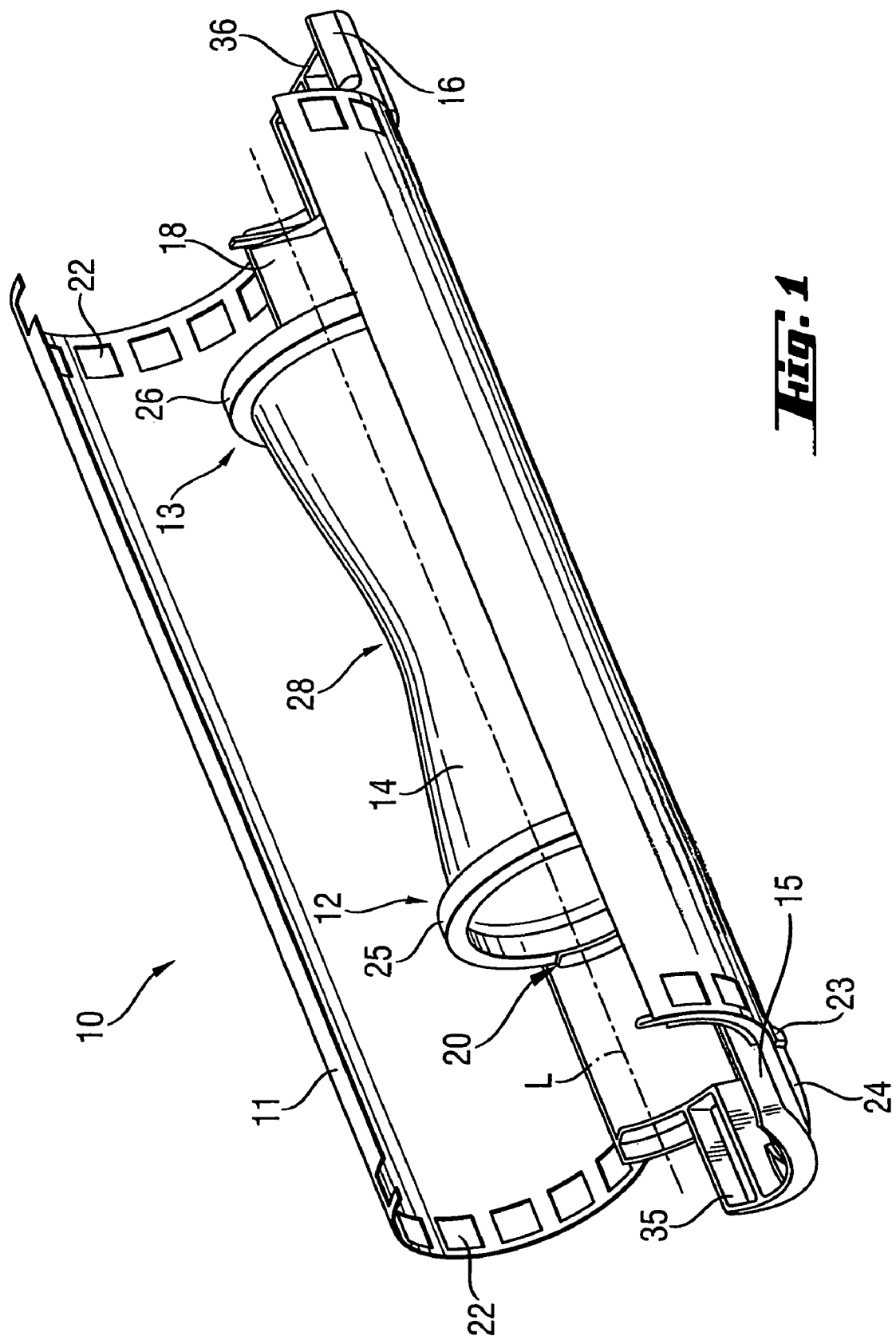
FIG. 1 a perspective view of a leadthrough according to the present invention and including a jacket tube and sealing element.
Figure 2:
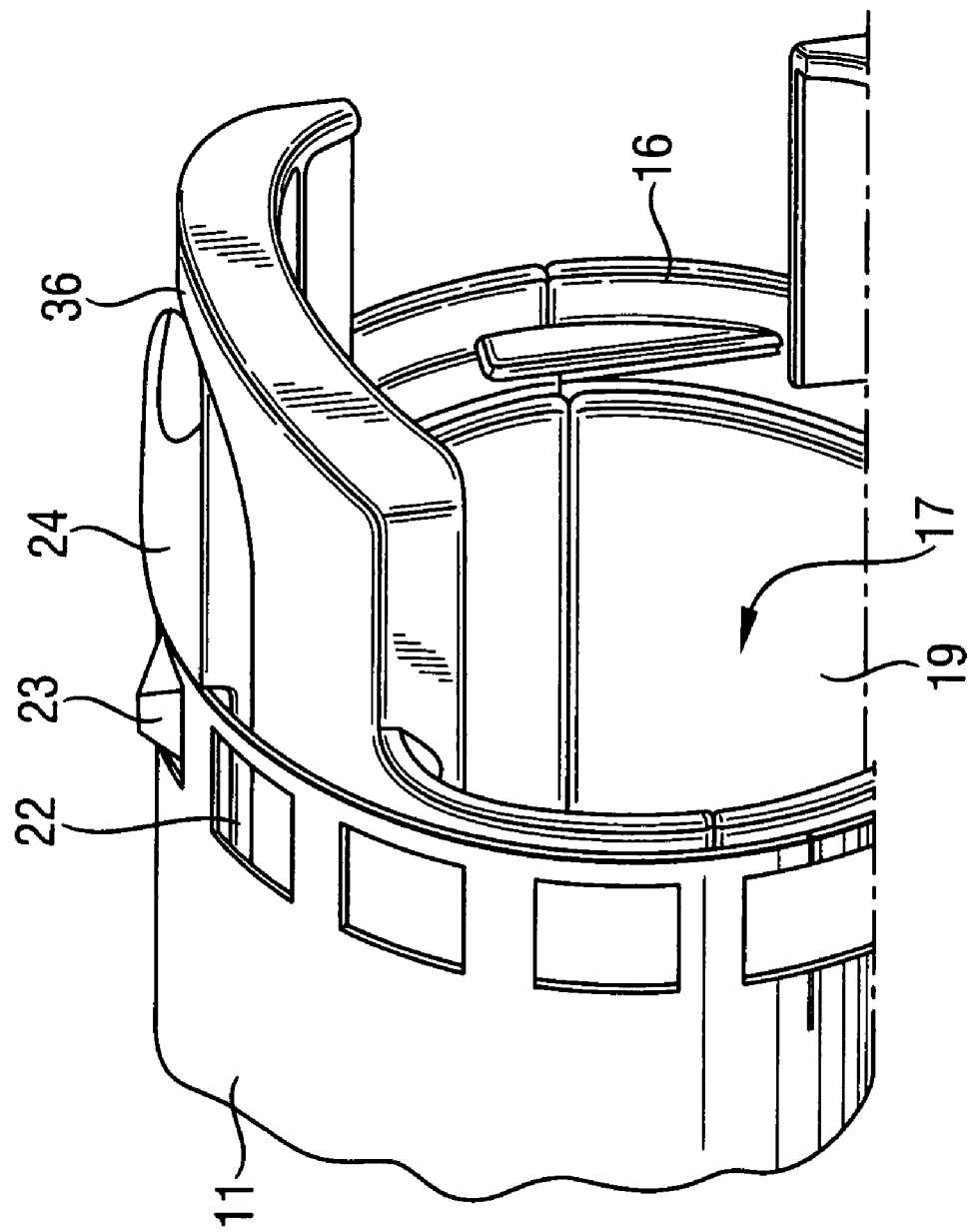
FIG. 2 a detail view of a section of the leadthrough shown in FIG. 1.

A leadthrough 10 according to the present invention, which is designed for insertion in a constructional component 50 (see FIGS. 3-4), e.g., a concrete wall and which is shown in FIGS. 1-4, has a jacket tube 11 that is formed of two parts and is shown in FIG. 1 in an open condition for a better clarity. The leadthrough 10 further includes a sealing element that is formed as a tubular body 14 rotatable about its longitudinal axis that serves as a rotational axis. At the opposite first and second ends 12, 13 of the tubular body 14, there are arranged, respectively, first and second ring members 25, 26 that serve as support members for the tubular body 14. The tubular body 14 is formed of, e.g., flexible and/or elastic, thin-walled, and gastight rubbery, cloth, or foil material and is provided on its inner side with an elastic material 27 such as, e.g., foamed material or rubbery material (see FIG. 3). "Thin-walled" signifies that the thickness of the material amounts to about 0.01-2 mm.

The elastic material 27 can be provided, e.g., in form of a continuous layer on the inner side of the tubular body 14 or, e.g., be applied regionwise, e.g., in form of strips or ribs extending in the longitudinal direction of the tubular body 14. The tubular body 14 an have a waist-like portion 28 that would have, in a mounted condition in the jacket tube 14 of the leadthrough 10, an inner diameter D1 smaller than the maximal diameter of the tubular body 14. The inner diameter defines a cross-sectional width of the opening of the tubular member 14 (so that the tubular bodies have an oval or polygonal cross-section and not a circular cross-section). The tubular body 14 is rotatable at its axial ends 12, 13 in opposite directions generally by at least 45°, preferably by at least 90°, so that the inner diameter of the tubular body 14 can be maximum reduced to zero value. Between the two ring members 25, 26 and/or between the two axial ends 12, 13 of the tubular body and jacket tube 11, in order to improve the gastightness, a seal can be provided.

The ring members 25, 26 form, together with a two-part first and second support member 35, 36, respectively, securing elements 15, 16 with which the tubular body 14 is secured in the jacket tube 11, with the tubular body 14 extending along the longitudinal extension of the jacket tube 11. The tubular body 14 have advantageously an axial length that corresponds at least to 1.5 times of its smallest diameter or, at not round tubular bodies, its smallest extent transverse to its longitudinal axis. The support members 35, 36 are formed, in the present case, regionwise as sleeve-shaped members and completely surround the tubular body 14. The support members 35, 36 have each a connection section 20 with which they are connected with the tubular body 14 or with the ring members 25, 26 which are connected with the tubular body 14 for joint rotation therewith. In the embodiment shown in the drawings, the ring members 25, 26 are clampingly secured on the connection sections 20. The support members 35, 36 further have each a receiving cavity 18 for a firestop means 19 and which surrounds the through-opening 17 (see FIGS. 1-3) which is provided on a side of the support member 35, 36 remote from the tubular body 14. The firestop means 19 is formed, e.g., as a ring of intumescent material and insures the fire protection of the leadthrough. In addition, in the interior of the jacket tube 11, e.g., in the middle between the ends of the jacket tube 11, an additional firestop element (not shown here), e.g., in form of a ring of an intumescent-material can be provided. As particularly shown in FIG. 2, each securing element 15, 16 has at least one locking element 23 lockingly engageable with a counter-locking element 22 provided on the jacket tube 11, in order to releasably secure a unit which is formed of the tubular body 14 and securing elements 15, 16, on the jacket tube 11.

In the embodiment of the invention shown in the drawings, the locking element 23 is formed, on each of the securing elements 15, 16, as a locking hook. The locking elements 23 are operated by an operational element 24.

In FIG. 1, the tubular member 14 is located in the jacket tube 11 together with the two securing elements 15, 16. The ring members 25, 26 are secured in the respective connection sections 20 of the support members 35, 36. The locking element 23 engages in the counter-locking element 22 provided on the jacket tube 11 (see also FIG. 2).

Figure 3:
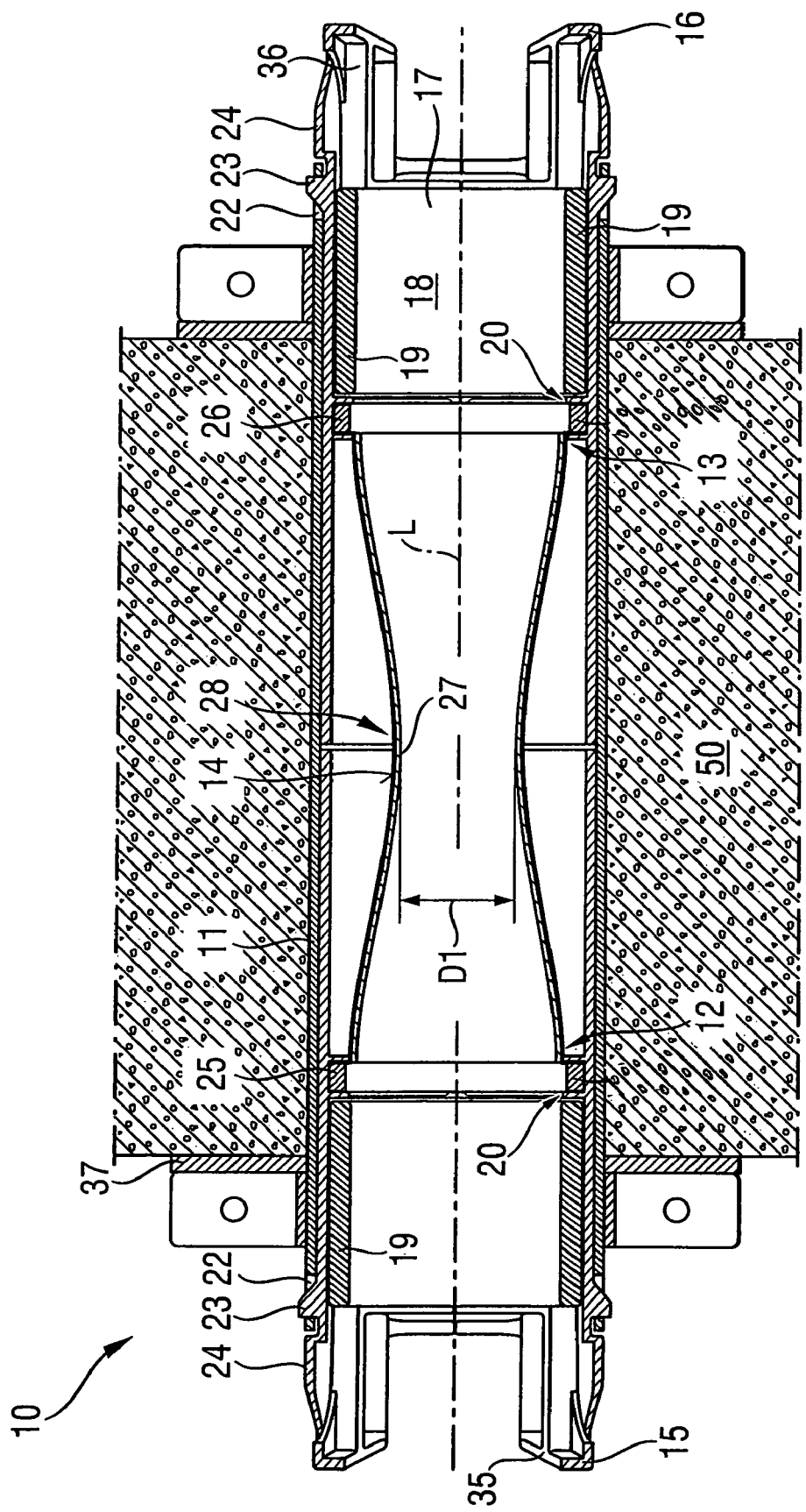
FIG. 3 a cross-sectional view of the leadthrough shown in FIG. 1 in a mounted condition in a constructional component.
Figure 4:
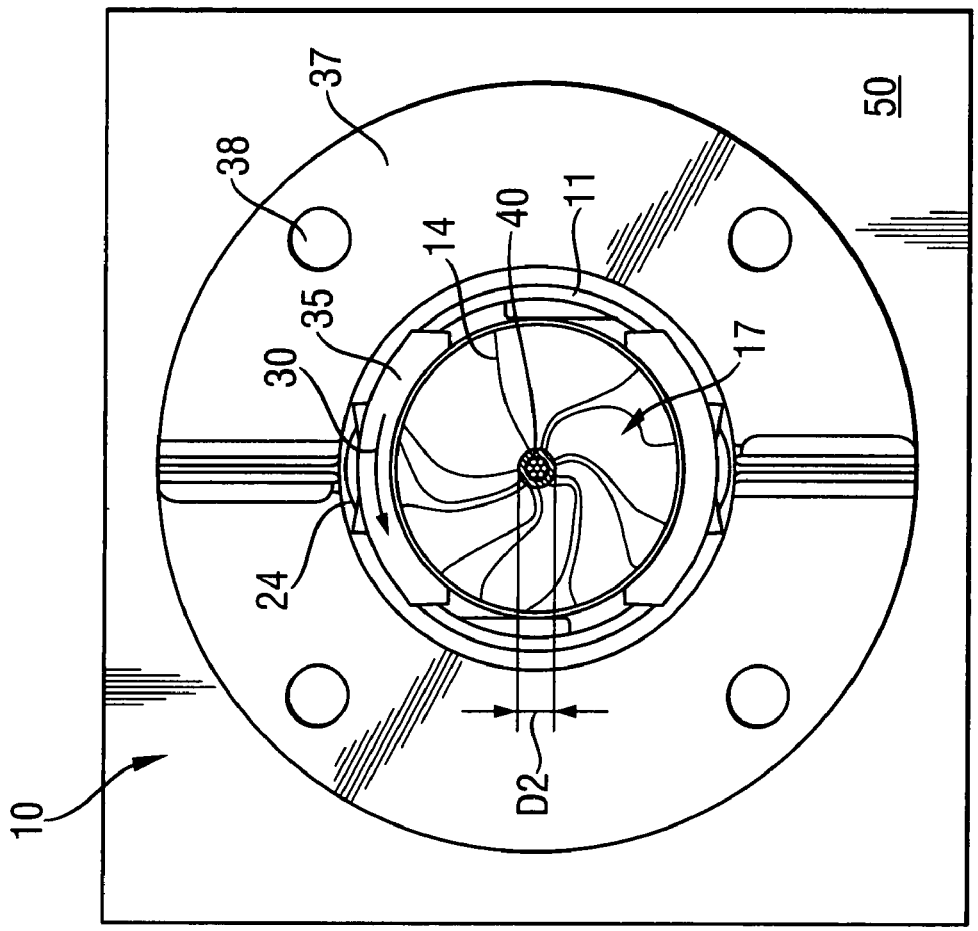
FIG. 4 a side view of the leadthrough shown in FIG. 3 with an inserted conduit and a closed sealing element.

FIGS. 3-4 show an arrangement of the inventive leadthrough 10 in constructional component 50. The leadthrough 10 can be inserted in an opening in the constructional component 50 or be embedded there during the formation of the constructional component, e.g., a concrete wall. For preventing action of tensioning or thrust forces on the leadthrough 10, the leadthrough has, on both side of the constructional component 50, mounting elements 37 such as, e.g., mounting flanges which have openings 38 for passing fastenings elements such as, e.g., screws or nails. The cross-section or the diameter D1 in the region of the waist-like section 28 of the tubular body 14 is so selected that conduits 40 such as cable, tube, etc. shown in FIG. 4, can be inserted therethrough, without damaging the tubular body 14.

After a conduit 40 has passed through the opening 17 of the leadthrough 10, one of the securing elements 15, 16 can be released with respect to the jacket tube 11 by manually lifting the locking elements 23 off the counter-locking elements 22 with the operational element 24. Finally, a securing element 15, 16 can be rotated relative to the jacket tube 11, e.g., in direction of arrow 30 in FIG. 4. This results in rotation of the tubular body 14 the cross-section of which is so reduced that it tightly surrounds the conduit 40, as shown in FIG. 4. The tubular body 14 has only an inner diameter that corresponds to the diameter D2 of the conduit 40. In this rotated or pivot position, the locking elements 23 can again fall in the counter-locking elements 22, after the operational element 24 is not operated any more by the user, so that the tubular body 14 becomes secured in its rotated or pivot positions. To open the tubular body 14 again, the above-described procedure should be repeated in an opposite rotational direction.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A sealing element for a leadthrough (10) for passing conduits (40) through constructional components (50) and including a jacket tube (11), the sealing element comprising a flexible tubular body (14) rotatable along a longitudinal axis (L) thereof that serves as a rotational axis; and a securing element (15) secured on at least first axial end (120 of the tubular body (14) for joint rotation therewith and having at least one locking element (23) formlockingly engageable in a counterlocking element (22) provided on a jacket tube (11) of the leadthrough (10) for releasably connecting the tubular body (14) with the jacket tube.

2. A sealing element according to claim 1, wherein the securing element (15) is formed of several parts containing a ring member (25) connected with the tubular body (14) for joint rotation therewith, and a support member (35) connectable with the ring member (25), and wherein the at least one locking member (23) is arranged on the support member (35).

3. A sealing element according to claim 2, wherein the support member (35) has a cavity for receiving a firestop means (19).

4. A sealing element according to claim 3, wherein the firestop means (19) is formed as a ring of an intumescent material.

5. A sealing element according to claim 1, wherein the flexible tubular body (14) is formed of a cloth and is twistable about a longitudinal axis (L) thereof that serves as a rotational axis and along the longitudinal axis.

6. A sealing element according to claim 5, wherein the tubular body (14) has a second axial end opposite the first axial end, the first and second axial ends (12, 13) being generally rotatable relative to each other by an angle of at least 45°.

7. A sealing element according to claim 6, wherein a further securing element (16) is provided on the second axial end (13) of the tubular body (14).

8. A sealing element according to claim 1, wherein the locking element (23) is formed as a projection engageable in an opening forming the counter-locking element (22) of the jacket tube (11).

9. A sealing element according to claim 1, wherein the tubular body (14) is formed of a gastight material.

10. A sealing element according to claim 1, wherein an elastic material (27) is provided on an inner side of the tubular body (14).

11. A sealing element according to claim 1, wherein the tubular body (14) has, in middle region thereof, a waist-shaped section (28).

12. A sealing element according to claim 1, further comprising a firestop means (19) provided at the at least first axial end (12).

13. A leadthrough (10) for passing conduits (40) through constructional components, comprising a jacket tube (11); and at least one sealing element releasably connectable with the jacket tube and having a flexible tubular body (14) formed of a cloth and twistable about a longitudinal axis (L) thereof that serves as a rotational axis and along the longitudinal axis, and a securing element (15) secured on at least first axial end (12) of the tubular body (14) for joint rotation therewith, wherein the jacket tube (11) has at least one counter-locking element (22), and the securing element (15) has a locking element (23) formlockingly engaging the counter-locking element (22).

14. A leadthrough (10) according to claim 13, further comprising firestop means (19) provided at least one of axial ends thereof.

\* \* \* \* \*